March 28, 1933.    W. E. SHARP    1,902,912
LOCK NUT AND PROCESS OF MAKING
Filed March 5, 1930
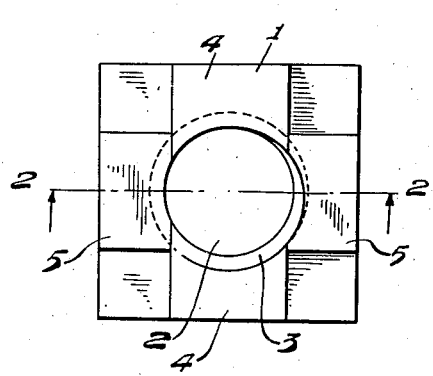
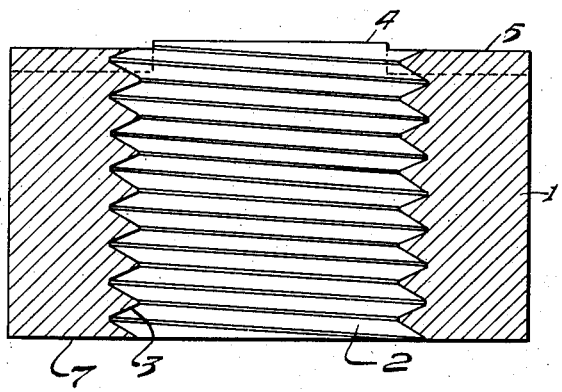
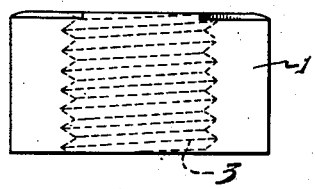
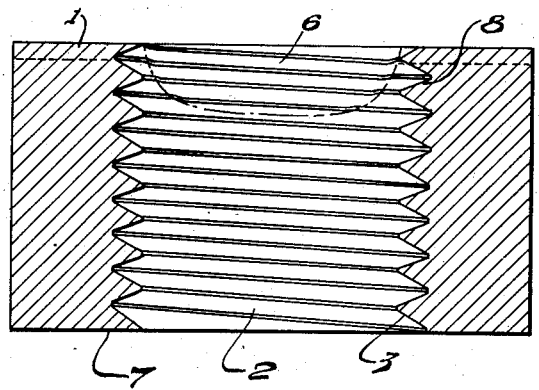
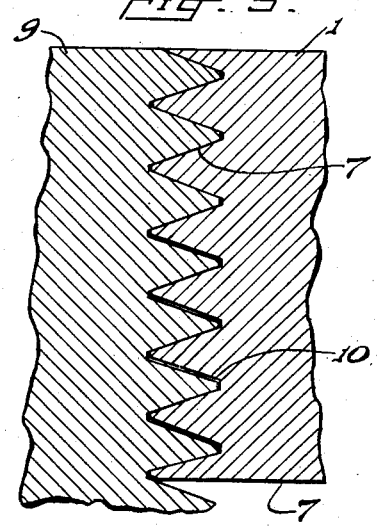
Inventor
William E. Sharp
By Towson Price
Attorney Patented Mar. 28, 1933

1,902,912

UNITED STATES PATENT OFFICE

WILLIAM E. SHARP, OF CHICAGO, ILLINOIS

LOCK NUT AND PROCESS OF MAKING

Application filed March 5, 1930. Serial No. 433,373.

This invention relates to improvements in friction locking nuts.

The principal object of my invention, generally considered, is the production of friction locking nuts in which certain portions of certain threads are deflected from their normal helical path, to produce the lock, and in which the remaining portions of the same threads are deflected a lesser amount, to take up the normal clearance between the threads of the nut and those of an associated bolt.

Another object of my invention is the production of lock nuts with two preferably central ridges, angularly disposed with respect to each other, on one face thereof, bisected by the bolt hole, to provide for the desired deflection of certain threads therebeneath, not only for producing a lock, but also for taking up the slack normally existing between the threads of the nut and those on an associated bolt.

A further object of my invention is the manufacture of locking nuts formed with angularly related, centrally disposed ridges extending across the face thereof, for the purpose of improving the action and facilitating the manufacture of such nuts.

A still further object of my invention is to improve on the process of making friction locking nuts by providing a pair of intersecting ridges, both of which are intersected by the bolt hole, on one face thereof, and which ridges are different in height; and by applying pressure to said ridges to deflect them differentially, whereby the locking power is imparted to certain portions of certain threads, beneath the larger, or higher, ridge, and whereby the portions of said threads beneath the smaller, or lower, ridge, are deflected just enough to take up the slack normally existing between the threads of the nut and those on an associated bolt, thus augmenting the gripping action of the lock by the frictional action of the engaging thread portions which, because of said frictional action, have no clearance between them.

An additional object of my invention is, by cold working or pressing during the process of making, so to harden, and to increase the density of, locking nuts that improved wearing quality is imparted to the threads, whereby they may be applied and removed a plurality of times without appreciable loss of locking action.

Other objects and advantages of the invention, relating to the particular arrangement and construction of the various parts, will become apparent as the description proceeds.

Referring to the drawing illustrating my invention, the scope whereof is defined by the appended claims:—

Figure 1 is a plan of the top or one face of a nut embodying my invention.

Fig. 2 is a transverse sectional view, on an enlarged scale, on the line 2—2 of Figure 1, looking in the direction of the arrows.

Fig. 3 is a side elevation of the nut such as shown in Figure 1, after the same has been deflected to produce the lock.

Fig. 4 is a view corresponding to Figure 2, but showing the nut after it has been subjected to the desired pressure, or deflection, to produce the locking nut shown in Fig. 3 and to take up slack and clearance on threads thereof with respect to those on a corresponding bolt.

Fig. 5 is a fragmentary sectional view corresponding to Fig. 4, on an enlarged scale, showing the engagement between the threads on the nut embodying my invention and those on an associated bolt.

In my prior Patent No. 1,271,782, dated July 9, 1918, I described and claimed a lock nut, and the process of making the same, involving the formation of a centrally disposed ridge across one face of a nut, and subsequent deflecting or squeezing of said ridge to deflect the threads adjacent thereto, thus to produce a friction lock on said threads with respect to threads on an associated bolt. Those portions of the threads between the deflected portions, or those portions circumferentially disposed 90° with respect to the ridge, are unaffected, so the engagement with respect to associated bolt threads is normally affected only by the fact that the locking action of the other thread portions tends to draw the nut threads outwardly with respect to the bolt threads, so that all of the normal clearance between the nut and bolt threads is placed between the bottom sides of the nut threads and the adjacent top sides of the bolt threads, when the nut is applied downwardly. On account of this normal clearance or slack between the nut and bolt threads, that amount of locking deflection corresponding to this slack is unavailable for producing a locking action, so the effective locking action corresponds to the deflection produced in the locking threads minus the normal slack between the threads on the nut and those on an associated corresponding bolt. It is the object of my invention, therefore, to utilize all of the locking deflection by taking up, by supplemental means, the slack between the remainder of the threads and the corresponding thread portions on an associated bolt.

Referring to the drawing, which shows in detail an embodiment of my invention, I have illustrated in Figs. 1 and 2 a form of nut 1 with a bolt hole 2 and provided with threads 3 in said bolt hole. On one face, which in the drawing appears as the upper face of the nut, I provide a relatively high or deep ridge 4 and a relatively low or shallow ridge 5. Said ridges preferably intersect at right angles with respect to one another, the axes of each preferably intersecting at the axis of the nut or center of the bolt hole, and each is preferably disposed parallel to corresponding sides of the nut, if a square nut is used. It will be understood, however, that my invention is applicable to hexagonal and other types of nuts, and that I am not limited to having the ridges parallel to the sides of the nut.

The ridges 4 and 5 may be forged hot on the nut blank from a bar of stock in a manner similar to that described and claimed in my prior Patent No. 1,271,782. The ridge 4 may correspond with the ridge 4 shown in Figure 2 of said patent and the ridge 5 may be of a corresponding size but shallower, the difference in height or depth of the ridges 4 and 5 preferably being slightly less than the amount of deflection intended to be applied to the nut to produce the lock, so that when the nut is deflected, both ridges are deflected or compressed to some extent.

In Figs. 3 and 4 I have shown views of the nut illustrated in Figs. 1 and 2 after the threaded nut has been deflected, as by being passed through a suitable press or deflecting machine, to squeeze said nut axially until the desired locking deflection has been applied to a few of the threads 3 near or immediately below the ridge 4, as indicated at 6 in Fig. 4. The threads 6 are deflected when the base 7 of the nut rests upon a suitable flat base or anvil, and pressure is brought squarely upon the ridges on both sides of the bolt hole, slightly compressing the metal directly adjacent or beneath the ridges toward the opposite face of the nut. This results in producing locking deflections 6 directly beneath the relatively high ridge 4, and in merely taking up the normal slack in those portions 8 of the threads so that, when engaged with or applied on a bolt 9 suitably threaded, as illustrated in Fig. 5, there is no clearance between the top threads while all the normal clearance appears at the bottom threads 10 or those adjacent the opposite face 7 of the nut. On account of the deflection of the nut threads being downward around the full periphery at the top, or adjacent the ridged face thereof, all the clearance between the bottom threads of the nut and the corresponding bolt threads is between the bottom faces of the nut threads and the corresponding top faces of the bolt threads, the normal clearance at the other side of said threads being taken up by the deflection of the locking threads or those adjacent the ridged face of the nut.

As an example of the size of the ridges, and of the amount of deflection that may be applied to nuts to produce the desired effect, I should say that, with a 1¼ inch square nut, the ridges 4 and 5 are desirably narrower than the diameter of the bolt hole, as in my prior patent previously referred to, and the ridge 4 is preferably .020 inch higher than the ridge 5; that is, the plane of the top face or surface thereof is disposed at that distance from the plane of the top surface of the ridge 5. The nut is then preferably placed in a deflecting machine of any desired character and squeezed .022 inch. It will be seen that, when this has been accomplished, the squeezing will have compressed the ridge 4 to the level of the ridge 5; and when the squeezing is then continued .002 inch more, the ridge 4 is deflected .022 inch, to produce the locking portions of the threads, while the ridge 5 is deflected only .002 inch, to take up slack, or clearance, on the remainder of the locking threads with respect to associated bolt threads. This insures that the lock produced is absolutely uniform and is the lock corresponding to a thread deflection of a predetermined amount, that is to say, .020 inch, without any chance for error caused by slack, or space, between the engaging nut and bolt threads. Because of this uniformity, it is possible, and desirable, to localize the effective lock in approximately the top two threads.

From the foregoing disclosure, it will be seen that I have devised an improved locking nut, preferably formed with angularly related centrally disposed ridges across the face of the nut for taking up the lateral slack between the engaging bolt and nut threads, and then producing locking deflection on nut threads.

Besides this advantageous improvement in the article, a further advantage is obtained in that such nuts are easier to manufacture, because the ridges assist in holding the nuts in a central position in the die while being punched and insure that the punching of the hole in the center of the nut is at right angles with the face, or axially thereof. By having one ridge lower than the other, said lower ridge receives just enough deflection to take up the allowable slack and nothing more, the higher ridge receiving a greater degree of deflection to produce the desired friction lock. By cold working or deflecting the nut around the full threaded periphery thereof, the density and hardness of the threaded metal is increased, giving the threads better wearing qualities whereby they may be applied and reapplied on associated bolts a considerable number of times without appreciable wear on the locking threads. In actually making nuts in accordance with the present invention, it was found that the scleroscope reading on the metal increased from 17, before cold deflecting the threads, to 29 after such deflecting.

Although I have disclosed a preferred embodiment of my invention, it will be understood that the same is merely illustrative and that modifications may be made within the spirit and scope of my invention as defined by the appended claims.

Having now described my invention, I claim:—

1. The process of making a lock nut, comprising forming a blank with a ridge extending across one face thereof and intersected by the bolt hole, and another ridge angularly disposed with respect to the first ridge, intersected by the bolt hole, and with its top face at a different elevation, forming a thread in said nut, and thereafter applying pressure to the ridges, whereby parts of the threads in line with the higher ridge on each side of the bolt hole are deflected to form locking portions, and parts of the threads in line with the other ridge squeezed together, to take up the normal slack with respect to the threads on a corresponding bolt.

2. The process of making a lock nut, comprising forming a blank with rectangular, almost flat, centrally disposed ridges perpendicular to the axis of the nut on one face thereof, angularly disposed with respect to one another and intersected by the bolt opening, forming a thread in said blank, and thereafter applying pressure to deflect the threads adjacent the face of the nut having the ridges thereon, whereby the parts of the threads adjacent one ridge are deflected to form locking means for the nut, and the parts of the threads adjacent the other ridge are deflected to merely take up the slack with respect to the threads of an associated bolt.

3. The process of producing a lock nut comprising forming central angularly disposed ridges intersected by the bolt hole, on one face thereof, forming a thread in said nut, and thereafter applying pressure to the ridges to deflect the threads, beneath one of said ridges, to produce a lock, and to deflect the threads, beneath the other of said ridges to a lesser extent, to take up slack with respect to the threads of an associated bolt.

4. The process of producing a lock nut comprising forming a blank with a bolt hole therethrough, threading said blank at the bolt hole, and thereafter cold pressing the upper surface of the blank to different degrees around the bolt hole, to deflect adjacent threads therebeneath, and increase the hardness of the blank, the deflection of portions of said threads being sufficient to produce a locking action, and the deflection of the other portions of said threads being less so as to merely take up the slack, with respect to the threads of an associated bolt.

5. The process of producing a locking nut, comprising forming central angularly disposed ridges intersected by the bolt hole on one face thereof, threading the nut at said bolt hole, and thereafter cold pressing the ridges to deflect the threads therebeneath adjacent said ridges to different degrees to increase the hardness thereof, to produce a lock under one ridge, and to take up slack with respect to the threads of an associated bolt under the other ridge, by pressing said ridge to a lesser extent than the lock producing ridge.

6. A nut of the kind described, pierced by a threaded bolt opening, one face of said nut having rectangular, almost flat ridges, angularly disposed with respect to one another, and intersected by the bolt opening, one of said ridges being cold pressed into the nut to a greater extent than the other.

7. A nut blank of the kind described, pierced by a threaded bolt opening and having a plurality of intersecting, centrally disposed ridges positioned at different elevations on one face thereof and intersected by the bolt opening.

8. A nut of the kind described, pierced by a threaded bolt opening and having a pair of centrally disposed ridges at right angles to one another, with one of said ridges deflected to a greater extent than the other, to form a lock and to take up slack in the threads with respect to corresponding bolt threads.

9. A nut of the kind described, pierced by a threaded bolt opening with threads in said opening formed cold, adjacent one face, with locking deflections in portions and deflected to a lesser extent in other portions to merely take up slack with respect to an associated bolt, said threads being thereby hardened around the full periphery by cold working, whereby the wearing qualities thereof are improved.

10. A lock nut having a few of the upper threads thereof deflected from their normal helical path a definitely controlled amount, within specified limits, whereby portions of said threads produce a lock, and other portions adjacent thereto are deflected a different amount, so that slack is taken up with respect to the threads on an associated bolt.

11. A lock nut having angularly disposed central ridges on one face thereof, said ridges being compressed so that threads adjacent thereto are deflected from their normal helical path definitely controlled amounts and to varying degrees so that spaced portions of said threads produce a lock, and portions therebetween are deflected to merely take up slack with respect to the threads on an associated bolt.

12. A lock nut having centrally disposed ridges angularly related one with another, the portions of the upper threads directly beneath said ridges being differentially deflected adjacent one face so that when the nut is applied to a bolt or the like, all play is taken up between said nut threads and the bolt threads around a portion of the periphery and a friction lock is produced around the remainder of the periphery.

13. A lock nut having a pair of ridges at right angles to one another and intersected by the bolt hole, said ridges being of different heights and deflected with respect to the nut until the heights are the same, whereby a few threads therebeneath are deflected, from their normal helical path, a definitely controlled amount within approximately the limits of from two thousandths to twenty-two thousandths of an inch.

14. A lock nut having centrally disposed ridges angularly related one with another, portions of threads directly beneath and adjacent said ridges being cold pressed and deflected to varying degrees so that the metal thereof is hardened, the wearing qualities thereof improved, and portions of said threads have a friction lock applied thereto while the remainder has slack taken up, so that all the deflection of the locking portions is effective.

In testimony whereof I affix my signature.

WILLIAM E. SHARP.